June 16, 1964  I. M. HIRSCHFELD ETAL  3,137,445
TANGENTIAL FLOW SPLASH PLATE INJECTOR
Filed Sept. 20, 1960
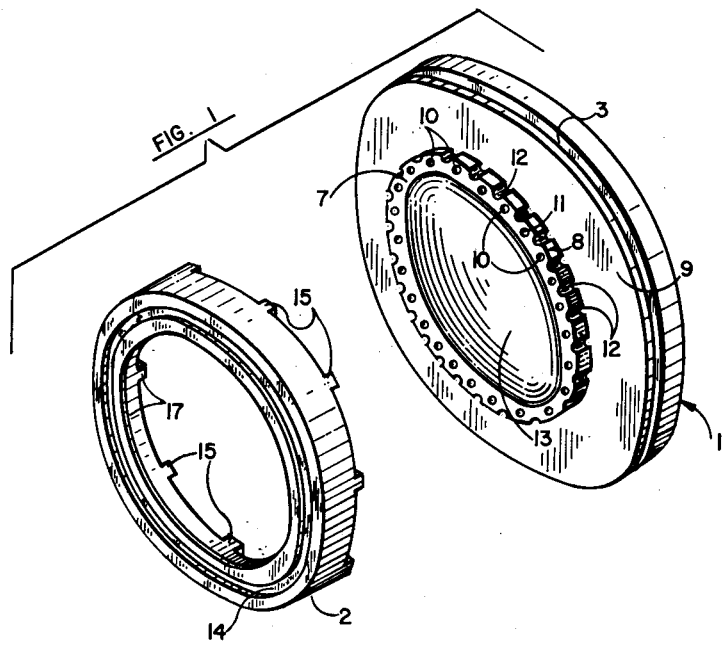
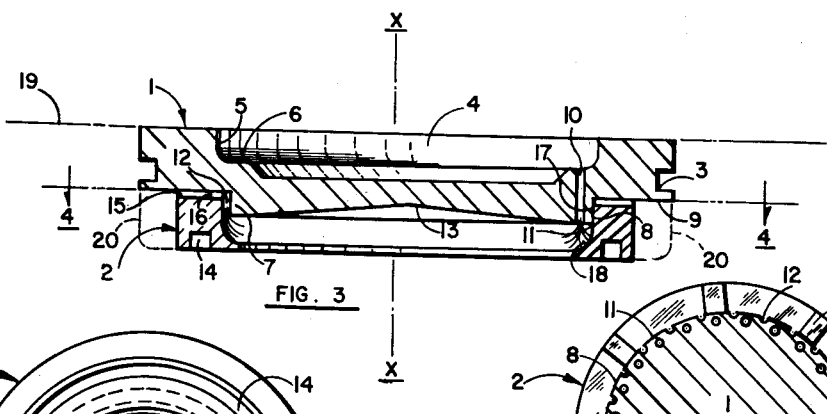
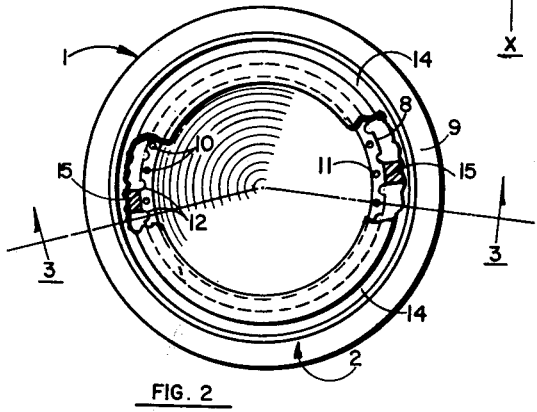
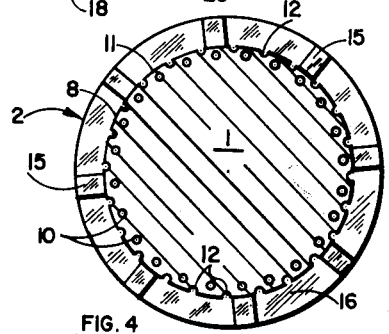
INVENTORS
IRVING M. HIRSCHFELD
RICHARD A. BARRETT
BY
Thomas S. MacDonald
ATTORNEY June 16, 1964     I. M. HIRSCHFELD ETAL     3,137,445
TANGENTIAL FLOW SPLASH PLATE INJECTOR
Filed Sept. 20, 1960     2 Sheets-Sheet 2

*INVENTORS*
IRVING M. HIRSCHFELD
RICHARD A. BARRETT
BY
Thomas S. MacDonald
ATTORNEY

# United States Patent Office 3,137,445
Patented June 16, 1964

3,137,445
TANGENTIAL FLOW SPLASH PLATE INJECTOR
Irving M. Hirschfeld, Woodland Hills, and Richard A. Barrett, Canoga Park, Calif., assignors to North American Aviation, Inc.
Filed Sept. 20, 1960, Ser. No. 57,210
10 Claims. (Cl. 239—423)

This invention relates to an injector device for use with combustion chambers of the type primarily adapted for powering rocket craft and more particularly relates to a tangential flow splash plate injector which is utilized to simultaneously feed liquid propellants to a rocket engine.

The trend of modern missiles, rockets and the like to greater speeds and range has required that the liquid bi-propellant type rocket engines utilized therein assure efficiently controlled propellant injection during all operational phases thereof. The prior art injector devices are generally complex in nature and therefore, require ultra skillful machining operations to afford their desired functions. Also, many of the prior art bi-propellant injector plates do not provide for complete atomization of the propellant constituents due to the inherently inefficient structural configurations thereof. Such prior art constructions do not function to accurately impinge the liquid propellant streams on a splash plate so as to efficiently mix and completely atomize the respective propellant constituents.

In contrast thereto the present invention essentially provides a bi-liquid injector device comprising a plate member and a ring member secured thereto in press-fit or brazed relationship. The plate member has alternate first and second radially positioned passage means formed therein which are constructed and arranged to discharge their respective liquid constituents onto a downwardly positioned splash plate surface means. Such a construction provides for a highly efficient mixing function whereby virtually complete atomization of the liquids is achieved.

An object of this invention is to provide an injector device for use with combustion chambers which device is of simple construction and may be easily fabricated while yet assuring the desired functions thereof.

A further object of this invention is to provide an injector device for use with combustion chambers whereby discharged liquid streams are accurately discharged to effect complete atomization thereof.

These and other objects of this invention will become apparent from the following description taken in connection with the accompanying drawings, in which:

FIG. 1 discloses a first embodiment employing the novel concepts of this invention with the two basic elements thereof shown in disassembled relationship.

FIG. 2 is an elevational end view showing the elements of the FIG. 1 injector device in assembled relationship.

FIG. 3 is a cross-sectional view taken on lines 3—3 of FIG. 2, the lines X—X representing the longitudinal axis of the injector device.

FIG. 4 is a sectional view taken on lines 4—4 of FIG. 3.

Figure 5:
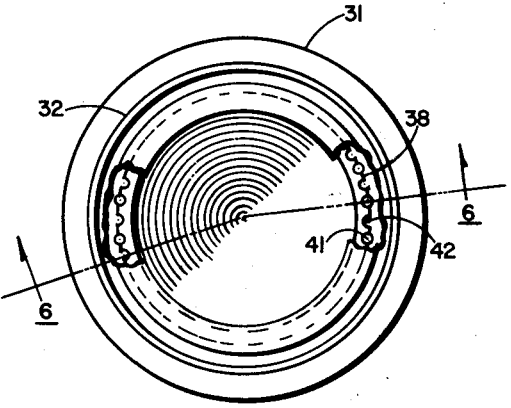

FIG. 5 discloses a second embodiment employing the novel concepts of this invention and is a view similar to that shown in FIG. 2.

Figure 6:
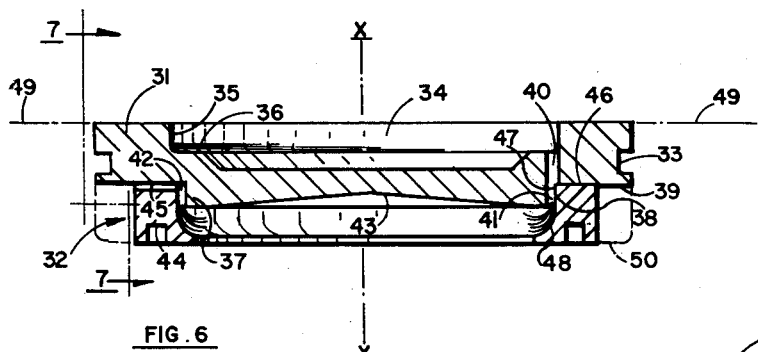

FIG. 6 is a cross-sectional view taken on lines 6—6 of FIG. 5.

Figure 7:
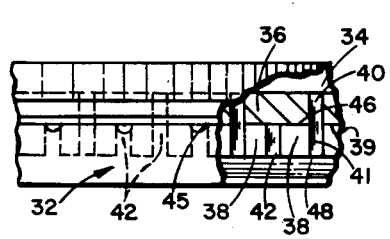

FIG. 7 is a sectional view taken on lines 7—7 of FIG. 6.

Figure 8:
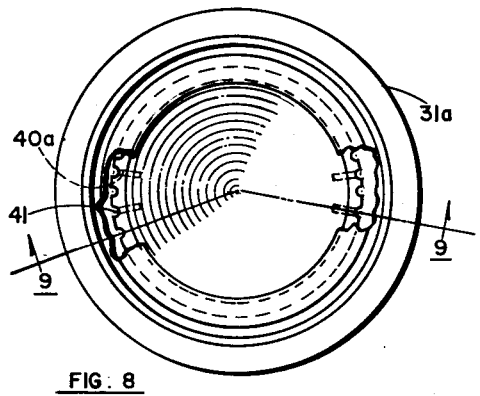

FIG. 8 discloses a third embodiment employing the novel concepts of this invention and is a view similar to that shown in FIG. 2 and FIG. 5.

Figure 9:
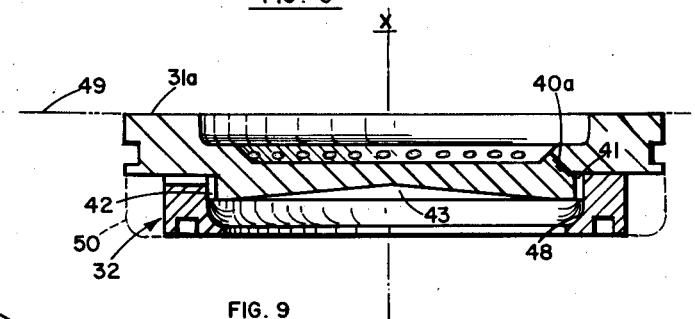

FIG. 9 is a cross-sectional view taken on lines 9—9 of FIG. 8.

The purpose of this invention is to provide a bi-liquid injector device for combustion chambers adapted to discharge liquid streams in a predetermined array so as to effect a thorough mixing and atomization thereof. The injector device of this invention essentially comprises a circular plate member having alternate first and second radially positioned discharge passage means formed therein and a ring member in press-fit or brazed relationship to said plate member. The ring member comprises a first wall portion in press-fit or brazed relationship with said plate member and a curved surface means positioned downwardly and adjacent the exit ends of said first and second passage means. Portions of the first wall portion and said curved surface means of said ring member are constructed and arranged to function as a splash plate, that is, to receive the discharged liquid constituents and provide for a highly efficient mixing function whereby complete atomization of the liquids is effected.

FIGS. 1–4 inclusive disclose a first embodiment illustrative of the novel concepts of this invention. As shown, the illustrated injector device is simply constructed to comprise two members; a circular plate member 1 and a circular ring member 2. The circular plate member 1 has a groove 3 formed on the periphery thereof which is adapted to retain a conventional "O" type sealing ring (not shown) when the plate member is positioned into operative alinement with a wall member of a cooperating combustion chamber.

A cutout portion 4 is formed in the upper face of the plate member and is adapted to retain a first liquid constituent therein which is pressurized in the conventional manner. Such a first liquid constituent may comprise a conventional type liquid oxidizer, for example, utilized as one of the bi-propellant constituents in modern day missile and rocket type engines. The hereinafter recited second liquid constituent may then comprise a liquid fuel if so desired. Such an oxidizer-fuel liquid propellant combination is well known in the art. The cutout portion 4, as more clearly shown in FIG. 3, forms a longitudinally extending and inwardly facing first wall portion 5 and an inwardly extending first ridge portion 6 vertically disposed of said first wall portion.

As shown, the plate member 1 further comprises a downwardly extending circular shaped projection portion 7 which is constructed and arranged to form longitudinally extending and outwardly facing second wall portions or lands 8 and an outwardly extending second ridge portion 9. A plurality of longitudinally extending first discharge passages 10 are formed in plate member 1 and are radially and symmetrically disposed with respect to the longitudinal axis of the plate member 1. The passages 10 are formed therein to cooperate at their upper entrance end adjacent the first ridge portion to receive the first liquid constituent located in cutout portion 4 and are further constructed to terminate at their lower end to discharge the liquid adjacent the lower end of the second wall portion 8. In the preferred embodiment, the passages 10 are formed circular in cross-section. It should be noted that a thin section 11 of the plate member 1 is formed between the wall portion 8 and the first discharge passage 10. Such a section is effective to seal the passages 10 as shown in FIG. 3.

A plurality of longitudinally extending second discharge passages 12 are formed as notches on the second wall portion 8 of the plate member 1 and are radially disposed intermediate of the first discharge passages 10. As clearly shown in FIG. 3 the second discharge passages 12 terminate adjacent the second ridge portion 9. It should be further noted that the passages 12 comprise a semi-circular cross-section (half-round, i.e., 180°) in the FIGS. 1–4 preferred embodiment.

Although twenty-four first discharge passages 12 and twenty-four second discharge passages 12 are shown for illustration purposes, it should be understood that any number thereof may be employed depending on the specific application. Also, although the respective discharge passages are shown in FIG. 3 as circumferentially positioned an equal distance from the adjacent discharge passage such discharge passages may be staggered in a predetermined fashion according to desired functional requirements. It should be further understood, that as a matter of choice, the cross-sectional areas of the respective passages may comprise other configurations such as being triangular, square, etc. However, since the circular and semi-circular cross-sectional areas employed in the described preferred embodiments are more easily formed than other type configurations such cross-sectional areas may be very accurately positioned to thus provide for a more accurate spreading of the respective liquid constituent streams.

A conically shaped cutout portion is formed in the projection portion 7 and defines a downstream (exposed) face 13 on the injector plate 1. The face 13 functions as one wall of the combustion chamber and may be hard anodized or protected in any other type conventional manner to afford thermal protection thereat. Such protective coatings will depend to a large extent on the material from which the plate is made.

FIG. 1 discloses the circular ring member 2 in disassembled relationship with respect to the plate member 1. A circular groove 14, similar in construction to groove 3 formed on the plate member 1, is formed on the lower surface of ring member 2 and is adapted to retain a conventional type sealing ring therein so as to effect a positive sealing action thereat when the injector device is placed into operative position.

When the plate member 1 and ring member 2 of FIG. 1 are brought together on their respective coincident longitudinal axes the leading faces of a plurality of lug members 15 formed on the ring member 2 are pressed into abutting relationship with the second ridge portion 9 formed on the plate member 1. Although eight such lugs have been shown in FIG. 1 and FIG. 4 the number thereof may be varied if so desired. The only functional requirement is that the lugs 15 are not positioned to close any of the second discharge passages 12. In the illustrated embodiment of FIGS. 1–4, since there are eight such lug members and twenty-four second discharge passages 12, each pair of circumferentially adjacent lugs will contain three discharge passages 12 therebetween as clearly shown in FIG. 4. The closed spaces thus formed between the three internal walls of the lug members 15 and the second ridge portion 9 are constructed and arranged to form passageways 16 for the transmission of a pressurized second liquid constituent therethrough.

The inwardly facing wall of the ring member 2 will be herein alternatively referred to as a splash plate surface means. The splash plate surface means comprises an upper portion 17 having first portions thereof which are axially pressed into press-fit relationship with axially alined circumferential portions of the second wall portion 8 of the plate member 1. The splash plate surface means further comprises a downwardly and inwardly curved portion 18 which is juxtaposed to the respective discharge ends of the first and second discharge passages. As clearly shown in FIG. 3, such a splash plate surface means construction provides that the curved portion 18 receives the first discharged liquid from the first discharge passages 10 substantially tangentially thereto via the second portions of the upper wall portion 17 and the second discharged liquid from the second discharge passages 12 tangentially thereto. Such an arrangement provides for a thorough mixing and atomization of the first and second discharged liquids which mixing is enhanced due to the increased turbulence induced by the near-tangential arrangement of discharge passages 12.

A chamber cover plate 19, shown by phantom lines in FIG. 3, is operative to contain the pressurized first liquid constituent in cutout portion 4 when the injector device is operatively positioned relative to a cooperating combustion chamber. The pressurized second liquid constituent is contained in a tubular type cylindrical manifold 20 also shown in phantom lines. Conventional type first and second liquid constituent entrance pressurizing means may be operatively connected to the respective chambers for transmitting the liquid constituents therein under a predetermined pressure.

FIGS. 5–7 inclusive disclose a second embodiment similar to that disclosed in FIGS. 1–4 inclusive which second embodiment also employs the novel concepts of this invention. The basic difference between the first two embodiments is the rearrangement of the respective first and second liquid constituent discharge passages. The second illustrated embodiment is also simply constructed to comprise a circular plate member 31 and a circular ring member 32. A groove 33 is formed on the periphery of the plate member 31 and is adapted to retain a conventional type sealing ring therein in much the same manner as the groove 3 formed in the plate member 1 of the first embodiment.

A cutout portion 34 is formed on the upper face of the plate member and is adapted to retain a selectively pressurized first liquid constituent therein by means of a cover plate 49. Such a cutout portion 34 forms a longitudinally extending and inwardly facing first wall portion 35 and an inwardly extending first ridge portion 36 vertically disposed of said first wall portion. The plate member 31 further comprises a downwardly extending circular shaped projection portion 37 which is constructed and arranged to form second wall portions or lands 38 and an outwardly extending second ridge portion 39, as shown.

A plurality of longitudinally extending first discharge passages are formed in plate member 31 and preferably comprise a first portion 40 circular in cross-section and a second notch type portion 41 semi-circular or half-round in cross-section. Such first liquid discharge passages are radially and symmetrically disposed with respect to the longitudinal axis of the plate member. The first portions 40 of the first discharge passages cooperate at their upper entrance ends adjacent the first ridge portion 36 to receive the pressurized first liquid constituent thereat. The second portions 41 of the first discharge passages are formed on the second wall portion 38 and terminate at their lower ends to discharge the pressurized first liquid constituent adjacent the lower end thereof.

A plurality of second discharge passages or notches 42 are formed on the second wall portion 38 and are radially disposed intermediate of the second portions 41 of the first discharge passages. As clearly shown in FIG. 6, the second discharge passages 42 terminate at their upper end adjacent the second ridge portion 39. The second discharge passages 42 also preferably comprise a semi-circular or half-round cross-section similar to that formed by the second portions 41 of the first discharge passages.

The circular ring member 32, disclosed in assembled position, has a circular groove 44 formed thereon which groove is adapted to retain a conventional type sealing ring therein in much the same manner as the groove 14 formed on the ring member 2 of the first embodiment. A plurality of inwardly extending entrance passages 45 are formed on the upper surface of the ring member 32 and cooperate with the second discharge passages 42 for the transmission of the pressurized second liquid constituent therethrough from a manifold 50 shown in phantom lines. As more clearly shown in FIG. 7, the leading surface 46 of the ring member is pressed axially against the second ridge portion 39 to seal the first and second discharge passages from each other. In this and the subsequent embodiment the sealing just mentioned may be assured by brazing the parts together.

The inwardly facing wall of the ring member 32 may be considered a splash plate surface means and comprises an upper portion 47 and a lower curved portion 48. The upper portion 47 comprises first portions thereof which are axially brazed into assembled relationship with axially alined circumferential portions of the second wall portion 38 of the plate member 31 to thus retain the members in assembled position. The lower end of the inwardly facing wall forms a downwardly and inwardly curved surface portion 48 which is juxtaposed to the discharge end of the first and second discharge passages to thus form a splash plate surface means with second portions of the upper portion 47. Whereas the first discharge passages of the FIGS. 1–4 embodiment did not discharge their respective liquid constituents tangentially with respect to the inner wall portion of ring member 1 the elements of the FIGS. 5–7 inclusive embodiment are constructed and arranged to discharge both the first and second liquid constituents tangentially with respect to the inner wall of the ring member. As clearly shown in FIG. 6 such a splash plate surface means provides that the curved portion 48 receives the first and second discharge liquids tangentially thereto to provide for accurate placement and disposition of the respective liquid streams thereby providing for efficient mixing and atomization thereof.

The FIGS. 5–7 embodiment is brazed in the conventional manner, depending to a large extent upon the materials involved, when the plate member 31 and ring member 32 are assembled together. Such a brazing step is effective to spread a very thin layer of brazing alloy between the parts, where they touch each other, which thin layer functions to positively seal the first liquid constituent area defined by cutout portion 34 and cover plate 49 from the second constituent area defined by the manifold 50.

The third preferred embodiment as shown in FIG. 8 and FIG. 9 employs the novel concepts of the FIGS. 5–7 embodiment with the only change therebetween being that of reorientating the first portion 40a of the plurality of second discharge passages as shown. The cross-sectional areas of the first portions 40a of the second discharge passages formed in circular plate member 31a are also preferably circular. This embodiment, like that of the embodiment disclosed in FIGS. 5–7 provides that the first and second discharge passages discharge their respective liquid constituents tangentially with respect to the inwardly facing wall of the ring member 32 to thus provide a splash plate surface means for the mixing and complete atomization functions.

The exposed downstream face 13 of the first embodiment and the face 43 of the FIGS. 5–7 and FIGS. 8 and 9 embodiments may be hard anodized or protected in any conventional manner, depending to a large extent on materials involved, to thus afford a greater thermal protection thereat.

Although not shown in the enclosed figures, it should be noted that the pressurized first liquid constituent retaining areas of all three heretofore described embodiments may incorporate a conventional type filler block operative to promote better cooling of the injector face by directing the incoming first liquid constituent over the back thereof. Also, the respective first liquid constituent retaining areas may, if so desired, incorporate other flow passages in the central portion thereof to enhance cooling and/or performance functions.

The above described injector plate embodiments as well as finding particular utility in combustion chambers of the type utilized to power rocket craft and the like may find further utility in many other conventional type combustion chamber applications wherein liquid fuel injection must be accurately and efficiently controlled.

Although this invention has been described and illustrated in detail, it is to be understood that the three heretofore described embodiments are by way of illustration and example only and are not to be taken by way of limitation, the spirit and scope of this invention being limited only by the terms of the appended claims.

We claim:
1. A bi-liquid injector device formed on a longitudinal axis comprising;
   a central plate member having a peripheral portion and a ring member, said ring member including splash plate means and further including first portions facing inwardly toward said axis and being secured to said peripheral portion of said plate member, first and second means adapted to discharge liquids alternately formed adjacent said periphery of said plate member and facing said splash plate means, said splash plate means formed on second portions of said ring member, said splash plate means being arranged adjacent to and adapted to receive the discharge of liquids from said first and second discharge means, said splash plate means extending radially inward toward said axis whereby liquid discharged from said first and second discharge means is mixed and atomized.

2. The invention of claim 1 wherein said ring member further comprises a plurality of passageways extending inwardly toward said axis and constructed and arranged thereon to cooperate with said second discharge means for transmitting constituents thereto.

3. The invention of claim 1 wherein said first discharge means comprises a plurality of passages radially disposed about said axis, extending toward said splash plate means and formed in said plate member inward of the peripheral portion of said plate member and said second discharge means comprises a plurality of passages radially disposed about said axis and extending toward said splash plate means and formed on the peripheral portion of said plate member said first and second discharge means being spaced from the splash plate means of said ring such that streams from both such discharge means impinge on said splash plate means.

4. The invention of claim 1 wherein said first discharge means comprises: a plurality of first passages radially disposed about said axis and extending toward said splash plate means, said first passages having first passage portions formed in said plate member in a direction away from the peripheral portion of said plate member and second passage portions formed on the peripheral portion of said plate member in juxtaposition to said first portions of said ring.

5. The invention of claim 2 wherein said passageways are formed by a plurality of lug members on said ring member constructed and arranged in abutting relationship with said plate member and disposed radially outwardly of said first discharge means.

6. The invention of claim 2 wherein said passageways are formed between a peripheral portion of said plate and a surface of said ring member which is constructed and arranged substantially perpendicular relative to said axis, said passageways extending radially outwardly of said second discharge means.

7. The invention of claim 4 wherein said second discharge means comprises: a plurality of second passages radially disposed about said axis extending toward said splash plate means and formed on the peripheral portion of said plate member, intermediate said passage portions.

8. The invention of claim 7 wherein said first passage portions are circular in cross-section and said second passage portions and said second passages are semi-circular in cross-section.

9. The invention of claim 8 wherein a thin coat of sealing means coats the contacted surfaces of said plate and ring members.

10. A bi-liquid injector device formed on a longitudinal axis comprising: a plate member comprising first and second sets of notches formed on the periphery thereof with a series of land portions therebetween; a ring member comprising a first wall portion, said first wall portion constructed and arranged to face inwardly toward said axis, said first wall portion further constructed and arranged in abutting relation with said land portions and overlying said first and second sets of notches, whereby apertures are formed by said notches and first wall portion, the axis of said apertures being substantially parallel to said longitudinal axis, said ring member further comprising a second wall portion tangentially positioned relative to said first and second sets of notches, said second wall portion constructed and arranged to face inwardly toward said axis; first passage means formed in said plate member cooperating with said first set of notches for passing a first liquid constituent therethrough; and second passage means formed in said ring member cooperating with said second set of notches for passing a second liquid constituent therethrough whereby said first and second liquid constituents may be selectively tangentially injected onto the second portion of said ring member for complete mixing and atomization of said first and second constituents.

References Cited in the file of this patent

UNITED STATES PATENTS

| | | |
|---|---|---|
| 1,785,803 | Adams | Dec. 23, 1930 |
| 2,532,711 | Goddard | Dec. 5, 1950 |
| 2,539,315 | Murphy | Jan. 23, 1951 |
| 2,602,290 | Goddard | July 8, 1952 |
| 2,606,421 | Goddard | Aug. 12, 1952 |
| 2,929,208 | Schultz | Mar. 22, 1960 |
| 3,013,389 | Barnes | Dec. 19, 1961 |